(No Model.)
R. E. HAMMER.
BRAKING MECHANISM FOR CYCLES.
No. 511,614. Patented Dec. 26, 1893.
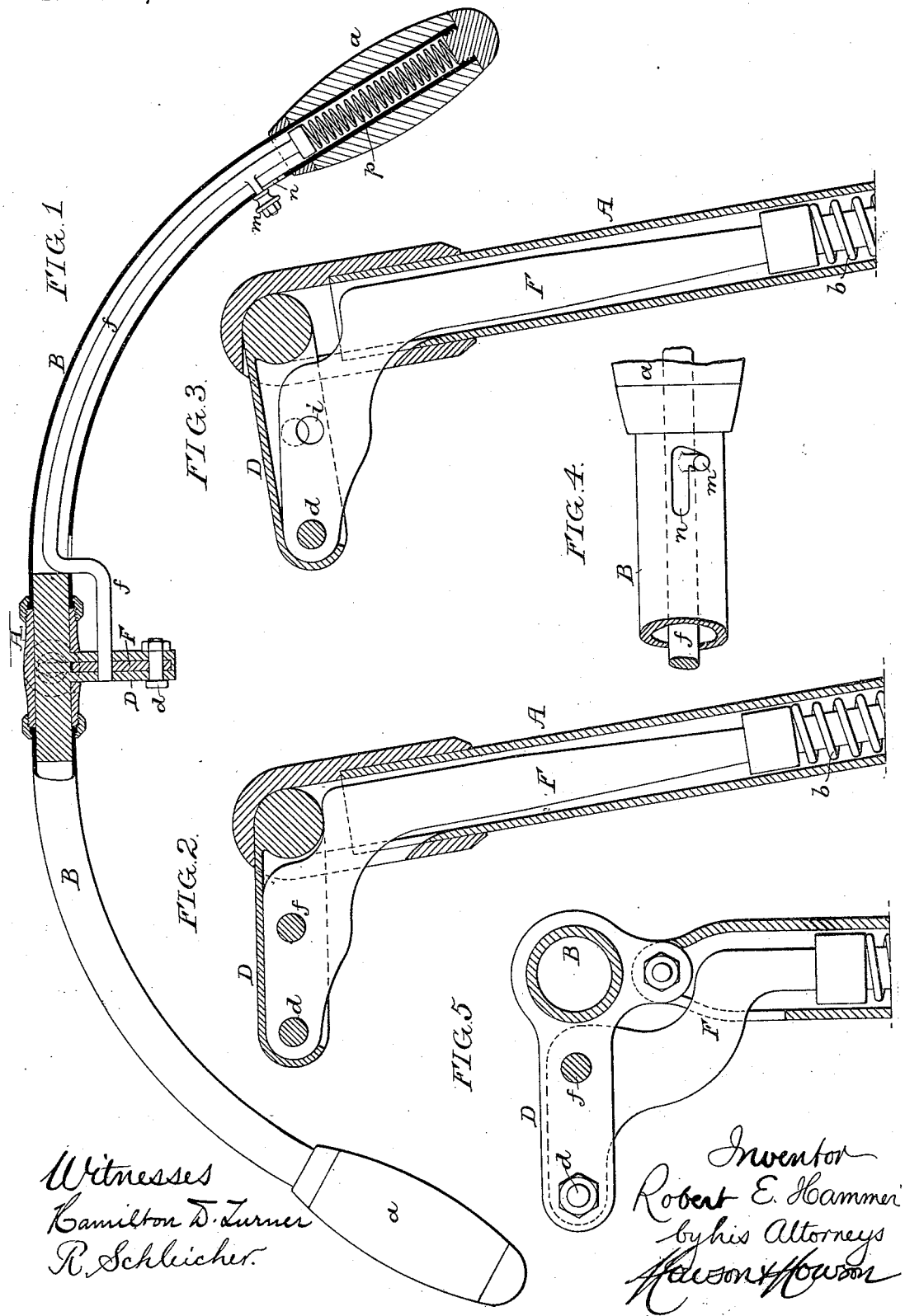

UNITED STATES PATENT OFFICE.

ROBERT E. HAMMER, OF PHILADELPHIA, PENNSYLVANIA.

BRAKING MECHANISM FOR CYCLES.

SPECIFICATION forming part of Letters Patent No. 511,614, dated December 26, 1893.

Application filed May 25, 1893. Serial No. 475,467. (No model.)

*To all whom it may concern:*

Be it known that I, ROBERT E. HAMMER, a citizen of the United States, residing in Philadelphia, Pennsylvania, have invented certain Improvements in Braking Mechanism for Cycles, of which the following is a specification.

My invention comprises simple and efficient means whereby the brake of a cycle can be applied by pressure upon the handles, and also means whereby the handle bar may be locked in position so as to be rigid and unyielding when it is not desired to apply the brake.

In the accompanying drawings—Figure 1, is a sectional plan view of part of the steering head and handle bar of a bicycle, showing my improved brake mechanism applied thereto. Fig. 2, is a sectional view on an enlarged scale of part of the device. Fig. 3, is a view similar to Fig. 2, but showing the parts in a different position. Fig. 4, is a detached view of part of the device; and Fig. 5, is a view illustrating a modified construction.

A represents part of the hollow steering head of a bicycle, and B the hollow handle bar clamped to the upper end of said head, so that it can have no lateral movement through the same, but is free to swing therein to a limited extent. The hollow portion of the steering head is slotted so as to permit of the projection through the same of a slotted arm D secured to the handle bar in any convenient manner so that downward pressure upon the handles $a$ of the handle bar will cause the depression of the outer end of said arm D when such movement is permitted.

The brake rod F passes through the hollow head A and is acted upon by a spring $b$ tending to lift the rod and take off the brake. The upper end of the brake rod extends rearwardly through the slot in the upper end of the steering head and enters the slotted arm D of the handle bar, and said rearwardly extending end of the brake rod is pivoted by means of a transverse pin $d$ to the outer end of said arm D, so that, in the absence of any locking device, the brake rod will be forced downward and the brake applied when the outer end of the arm D is depressed by the swinging movement of the handle bar caused by downward pressure upon the handles $a$ of the same, the spring $b$ serving to restore the parts to their normal position as soon as such downward pressure is removed from the handles $a$. As downward pressure is likely to be imparted to the handles $a$, however, oftentimes when it is not desired to apply the brake, means should be provided for locking the brake rod when the parts are in the position shown in Fig. 2. The device which I prefer for this purpose is a sliding bolt $f$ which passes through an opening in the arm D and enters an opening $i$ in the rearwardly extending upper end of the brake rod when said brake rod is elevated or in its normal position, and the brake is off, this bolt serving to lock the arm D and the upper end of the brake rod to each other and thus prevent any swinging of the handle bar in the head, so that the handles $a$ are as rigid as those of an ordinary bicycle.

For convenience, as well as to render the structure compact and neat in appearance I prefer to run the bolt $f$ through the hollow handle bar to a point within convenient reach of one of the handles $a$, a knob or button $m$ on the locking bolt, projecting through an L-shaped slot $n$ in the handle bar at such point, serving as a ready means for operating the bolt.

Within the handle is a spring $p$ which so acts upon the locking bolt that when the knob or button is in the elevated portion of the slot $n$, said spring will force the locking bolt inward and cause it to engage with the openings in the arm D and in the upper end of the brake rod, but the locking bolt can be withdrawn by means of its knob $m$ and the latter then turned down into the short or transverse portion of the L-shaped slot $n$ so as to retain the locking bolt in the retracted position during such time as it is desired to use the handles as a means of applying the brake, the parts being again locked in normal position by simply lifting the knob $m$ into the longitudinal portion of the slot $n$. The long bolt $f$ possesses sufficient torsional elasticity to permit the knob $m$ to be turned in the slot $n$, and if not, the knob may be mounted on the bolt so as to be turned thereon.

Although I have shown my invention as applied to a brake rod which passes down through the hollow steering head, it will be evident that it can also be applied to brake rods which are guided on the outside of the head and can be used with equally good effect either upon a brake rod adapted to apply a brake to the front or steering wheel, as shown, or to brake rods which operate brakes applied to a rear wheel or to a drum on the crank shaft. It is not necessary to my invention, moreover, that the handle bar should be so constructed as to be free to turn in the upper end of the steering head, for the upper end of the steering head may itself be hinged, as shown in Fig. 5, for instance, and the arm D may in such case be formed directly upon such pivoted upper end of the steering head as shown in said figure.

Having thus described my invention, I claim and desire to secure by Letters Patent—

1. The combination in a cycle, of a handle bar mounted so as to be free to yield to a limited extent when pressure is exerted upon the handles, an arm projecting from said handle bar, a brake rod, an arm projecting from said rod and pivoted to the arm of the handle bar, and a locking bolt carried by the arm of the handle bar and engaging with the arm on the brake rod whereby the movement of the handle bar is prevented, substantially as specified.

2. The combination in a cycle, of a hollow steering head, a handle bar mounted directly upon the upper end of said steering head in line with the steering axis of the same and so as to be free to yield to a limited extent when pressure is exerted upon the handles, a brake rod passing through said hollow steering head, and connections whereby the movement of the handle bar is transmitted to said brake rod, substantially as specified.

3. The combination in a cycle, of a hollow handle bar mounted so as to be free to yield to a limited extent when pressure is exerted upon the handles, a brake rod, connections whereby the movement of the handle bar is transmitted to said brake rod, a locking bolt extending part way through the hollow handle bar and serving to lock the brake rod and prevent movement of said bar, and means for operating said locking bolt, substantially as specified.

In testimony whereof I have signed my name to this specification in the presence of two subscribing witnesses.

ROBERT E. HAMMER.

Witnesses:
FRANK EDMUND BECHTOLD,
JOSEPH H. KLEIN.